Patented Oct. 9, 1934

1,976,182

UNITED STATES PATENT OFFICE 1,976,182

DRIER FOR COATING MATERIAL

Friedrich Meidert, Frankfort-on-Main-Griesheim, Germany, assignor to I. G. Farbenindustrie Aktiengesellschaft, Frankfort-on-Main, Germany No Drawing. Application July 8, 1932, Serial No. 621,517. In Germany July 17, 1931

6 Claims. (Cl. 134—57)

The present invention relates to driers for coating material.

It is known that driers are added to drying oils, lacquers or oil paints in order to increase their capability of drying. A known drawback of these driers, of which the salts of cobalt, manganese, lead and zinc of naphthenic acid, linoleic acid and resin acid are the most used, is the oxidizability on exposure to air and the difficult and incomplete solubility in oils and volatile solvents caused thereby.

I have now found that the drawbacks as to oxidation can be avoided and that readily and completely soluble driers can be obtained by adding a certain protective agent during their preparation which as is known takes place by saponifying the afore-mentioned acids with caustic alkalies, precipitating these alkali metal soaps with the metal salt solutions of the specific siccative metals (cobalt, manganese, lead, zinc or the like) and washing the precipitate thus obtained. As protective agents there may be used the fatty acids containing 16—22 carbon atoms, such as palmitic acid, stearic acid, arachic acid, behenic acid; furthermore olefinic carboxylic acids, such as crotonic acid, acrylic acid, and the aromatic monocarboxylic acids, such as benzoic acid, the substitution products and derivatives thereof, such as amoni-benzoic acid (anthranilic acid), benzoyl benzoic acid, hippuric acid, cinnamic acid, mandelic acid, salicylic acid, phenyl acrylic acid, amino phenyl acetic acid. These additions may also be used in combination with one another, because the saturated fatty acids alone may exert an antioxidizing but simultaneously a thickening action, the latter being annulled by the addition of olefinic or aromatic carboxylic acids.

The said substances may be added in a simple manner: the required quantity of the substances alone or in combination with one another is added, after the last washing water has been eliminated, to the drier obtained in known manner by precipitating the solutions of alkali metal soaps with solutions of heavy metal salts, of earth metal salts or of alkaline-earth metal salts. The washed product is kept in the fused condition at a temperature lying somewhat above the melting point, generally at 130° C. until the whole quantity of water has been eliminated. It is likewise possible to add the free acids in question to the finished anhydrous fused mass of the drier and to agitate the fused material until the addition is homogeneously distributed. The additions may also be introduced into the drier already during or after the precipitation, particularly in those cases where the free acids to be added are insoluble in water.

In order to improve the stability and solubility the afore-mentioned substances have to be added only in a quantity up to 10 per cent. of the pure drier; larger quantities involve no advantage, so that the content of siccative metal in these improved products is at most about 10 per cent inferior to that in the pure products. As by the addition of these substances the drier is dispersed in the solvent in a considerably improved manner, a reduction of the capability of drying of these substances, in comparison with the starting driers, can hardly be noticed.

The driers thus obtained do not oxidize on exposure to air and they do not change their original color even when being in contact with the air for a prolonged time, neither in the solid condition nor when being dissolved in the volatile solvents generally used in the paint and varnish industry, in which solvents they, in general, quickly and completely dissolve already at 100° C.–125° C. to a clear solution. Furthermore, these solutions do not show any tendency of gelatinizing or depositing.

The following examples serve to illustrate my invention, but they are not intended to limit it thereto, the parts being by weight:

1. 100 parts of naphthenic acid are saponified, according to the acid number, with 20–21 parts of caustic soda and the clear soap solution is quantitatively precipitated with a solution of 63–65 parts of crystalline cobalt sulfate. Towards the end of the precipitation there are introduced for each 100 parts of cobalt-naphthenate 6 parts of palmitic acid and the thoroughly washed product is dehydrated at a temperature of about 130° C.

2. Into 100 parts of a fused cobalt-manganese-naphthenate containing about 2 per cent of cobalt and 10 per cent of manganese there are introduced 5 parts of palmitic acid and 5 parts of benzoic acid. The fused mass is stirred until a uniform dissolution in the fused material is obtained.

3. 100 parts of colophony are saponified, as usual, together with 14 parts of caustic soda. The clear soap solution is then precipitated with a solution of about 20 parts of cobaltous chloride and 15 parts of cerous chloride. The resinate of cobalt and cerium is thoroughly washed and after the last washing water has been eliminated, 4 parts of crotonic acid, 2 parts of palmitic acid and 2 parts of benzoic acid are added and the mixture is fused, while stirring, until the water contained therein has completely evaporated.

4. 100 parts of crude or purified naphthenic acid are saponified at boiling temperature, while stirring, according to the acid number with 26-28 parts of anhydrous sodium carbonate. The clear hot soap solution is completely precipitated, while stirring is continued, first with a solution of 6 parts of crystalline cobalt sulfate, then with a solution of 3 parts of anhydrous manganese sulfate and finally with a solution of 24 parts of zinc chloride. The three different solutions may also be added to the soap solution simultaneously or in form of a mixture. The precipitate of cobalt—zinc-manganese-naphthenate is washed thrice to four times with boiling water until the sodium salts produced during the precipitation are completely eliminated. After the last washing water has been removed there are added to about 105 parts of the precipitation product obtained, 2 parts of palmitic acid and 2.5 parts of hippuric acid and the mixture is heated, while stirring, to 130° C.–140° C. or kept in a fused condition at this temperature until the water has completely evaporated. 5 parts of salicylic acid are then introduced into the fused material, stirring being continued for some time until a completely homogeneous distribution has taken place.

5. 100 parts of naphthenic acid are saponified, while boiling, according to the acid number with 28–29 parts of caustic potash. The clear soap solution is completely precipitated with a solution of 36–37 parts of anhydrous manganese sulfate. During the precipitation 5 parts of stearic acid are gradually added. The manganese naphthenate obtained is washed until the potassium sulfate is completely eliminated. After the last washing water has been removed 2 parts of mandelic acid and 2 parts of cinnamic acid are added. The mixture is then dehydrated at a temperature of about 130° C. while stirring until the water contained therein has completely evaporated. The fused material is then directly filled into the despatch containers.

6. 100 parts of linoleic acid are saponified in known manner with about 14 parts of caustic soda and the clear soap solution is completely precipitated with a solution of 21 parts of lead nitrate and 30 parts of cobalt sulfate. The precipitation product is thoroughly washed. After the last washing water has been eliminated, 3 parts of anthranilic acid and 3 parts of behenic acid are added and the mixture is dehydrated by fusing it until a test sample placed on a glass plate is completely transparent.

7. A mixture of 100 parts of naphthenic acid and 100 parts of fatty acid of soy bean oil are saponified in the usual manner together with 34 parts of caustic soda solution. Into the clear soap solution there are caused to run, while stirring, 66 parts of lead nitrate in form of a solution and stirring is continued until the lead is combined. About 24 parts of anhydrous manganese sulfate in form of a solution are added until the precipitation is complete. After the alkali metal salts have been eliminated by washing, the precipitation product is fused together with a mixture of 5 parts of palmitic acid, 2.5 parts of amino phenyl acetic acid and 2.5 parts of benzoyl benzoic acid. The mixture is kept in the fused condition until the water is eliminated.

In the following claims by the term "known driers" there are to be understood the metal salts (for instance the salts of cobalt, manganese, lead and zinc) of naphthenic acid, linoleic acid and resin acid.

I claim:

1. A solid drier for coating materials containing about 6 per cent. to about 10 per cent. of a saturated free fatty acid and one of the known solid driers selected from the group consisting of a siccative metal salt of naphthenic acid, a siccative metal salt of linoleic acid and a siccative metal salt of resin acid.

2. A solid drier for coating materials containing a saturated free fatty acid with 16 to 22 carbon atoms, a free aromatic mono-carboxylic acid said acids being present in a quantity of about 6 per cent. to about 10 per cent. and one of the known solid driers selected from the group consisting of a siccative metal salt of naphthenic acid, a siccative metal salt of linoleic acid and a siccative metal salt of resin acid.

3. A solid drier for coating materials containing a saturated free fatty acid with 16 to 22 carbon atoms, a free aromatic mono-carboxylic acid, a free olefinic carboxylic acid said acids being present in a quantity of about 6 per cent. to about 10 per cent. and one of the known solid driers selected from the group consisting of a siccative metal salt of naphthenic acid, a siccative metal salt of linoleic acid and a siccative metal salt of resin acid.

4. A solid drier for coating materials containing about 6 per cent. to about 10 per cent. of a saturated free palmitic acid and a siccative metal salt of naphthenic acid.

5. A solid drier for coating materials containing free palmitic acid and benzoic acid, said acids being present in a quantity of about 6 per cent. to about 10 per cent. and a siccative metal salt of naphthenic acid.

6. A solid drier for coating materials containing free palmitic acid, free benzoic acid and free crotonic acid, said acids being present in a quantity of about 6 per cent. to about 10 per cent. and a siccative metal salt of naphthenic acid.

FRIEDRICH MEIDERT.